May 2, 1944.     C. P. GRIMES     2,348,127
HEAT TRANSFER AND DISSEMINATING APPARATUS
Filed Aug. 24, 1939     5 Sheets-Sheet 1
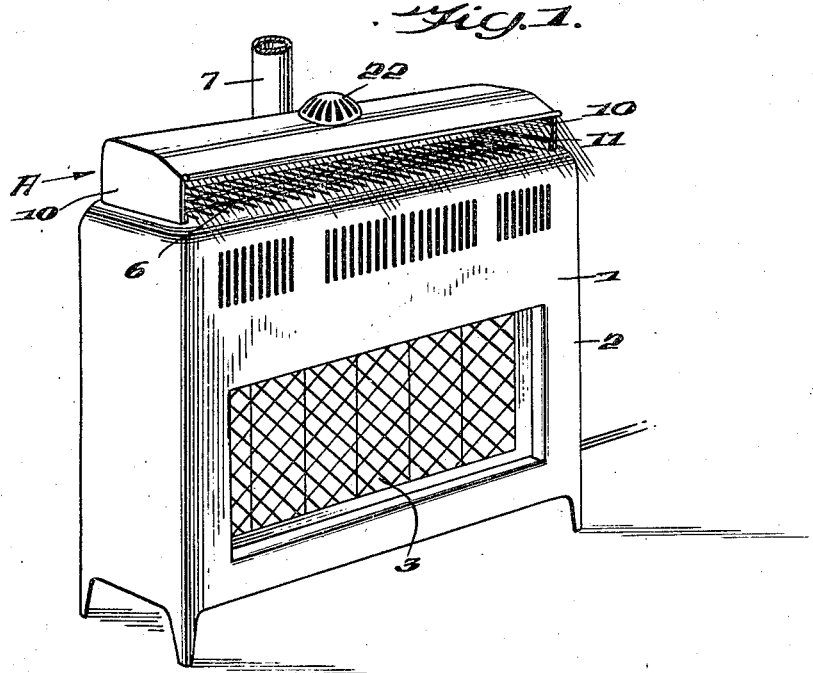
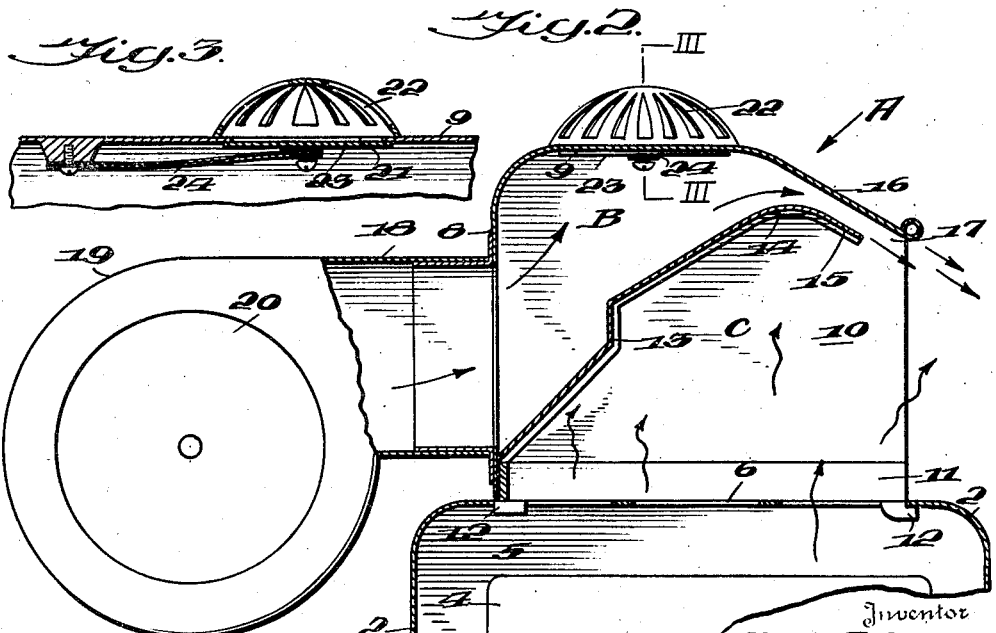
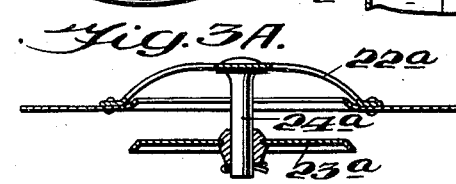
Inventor
Charles P. Grimes,
W. S. McDowell
Attorney

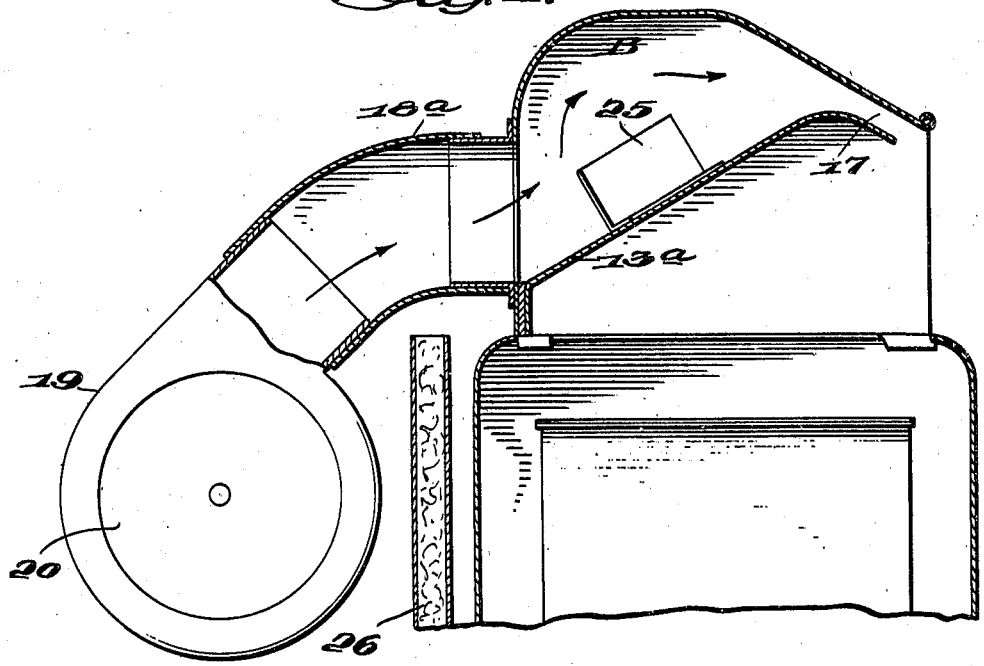
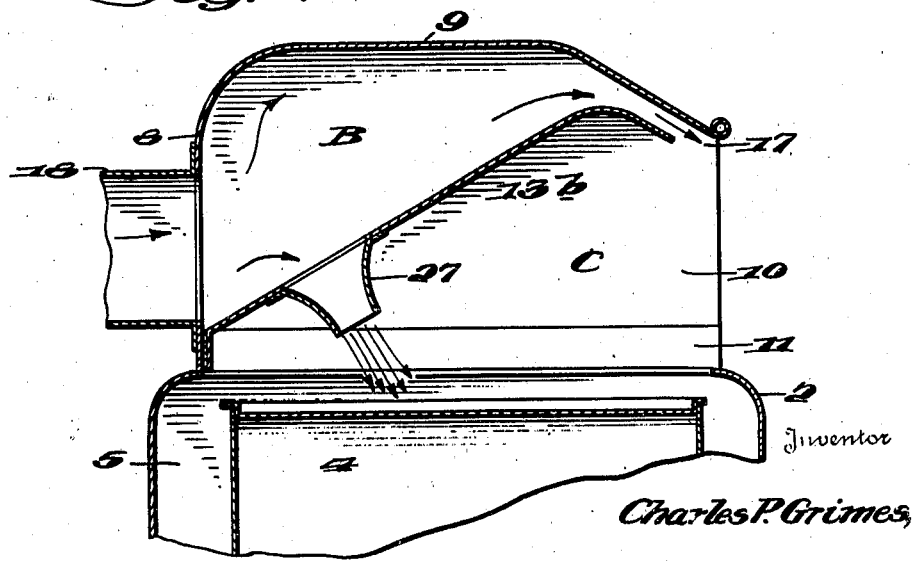

May 2, 1944.  C. P. GRIMES  2,348,127
HEAT TRANSFER AND DISSEMINATING APPARATUS
Filed Aug. 24, 1939   5 Sheets-Sheet 3
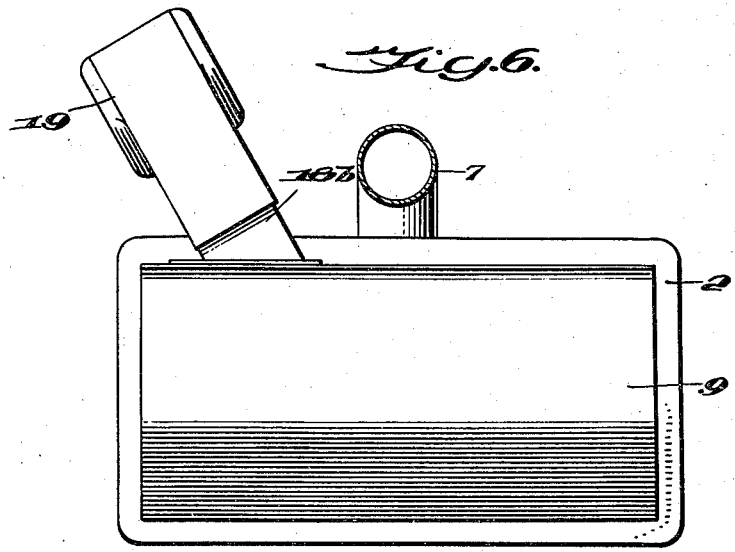
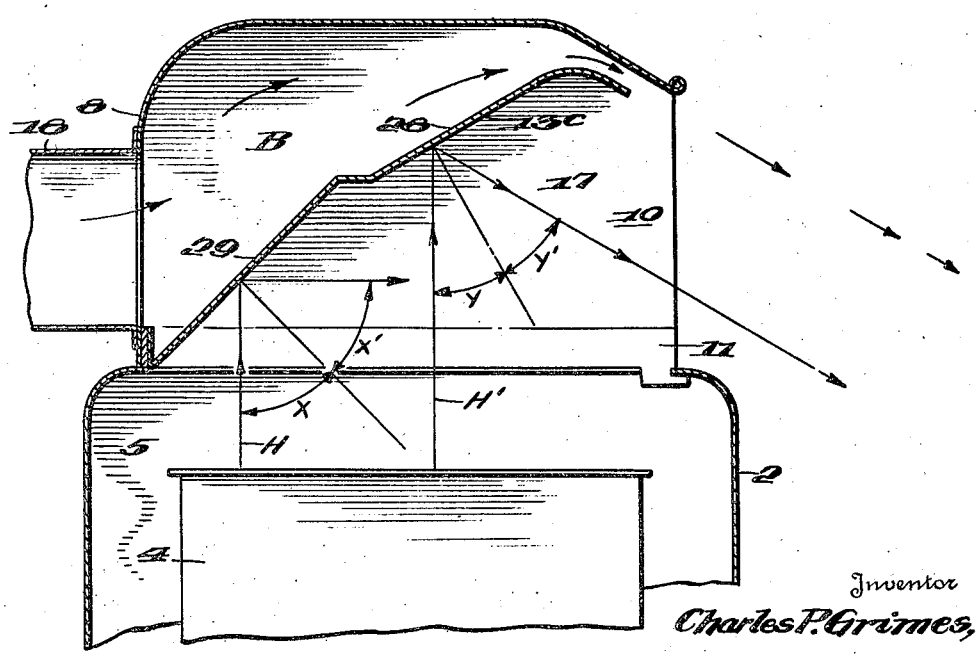
Inventor
Charles P. Grimes,
By W. S. McDowell
Attorney May 2, 1944. C. P. GRIMES 2,348,127
HEAT TRANSFER AND DISSEMINATING APPARATUS
Filed Aug. 24, 1939  5 Sheets-Sheet 4
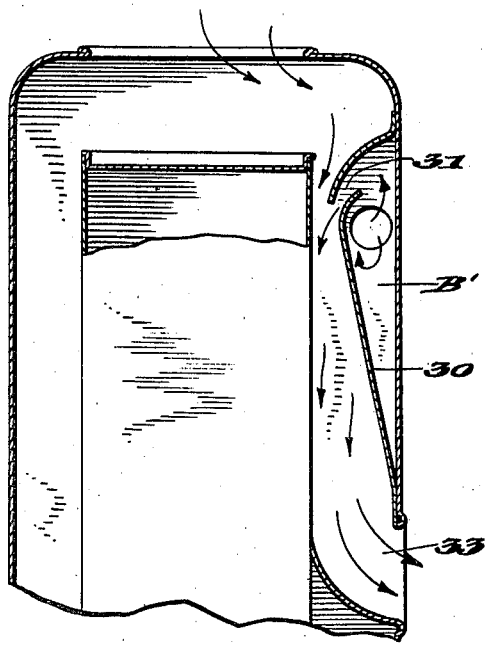
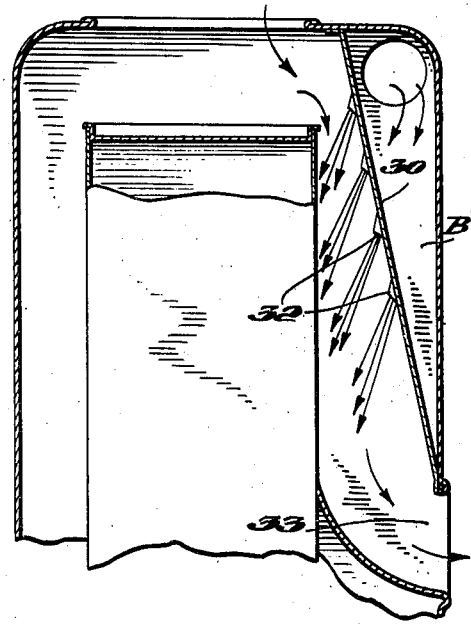
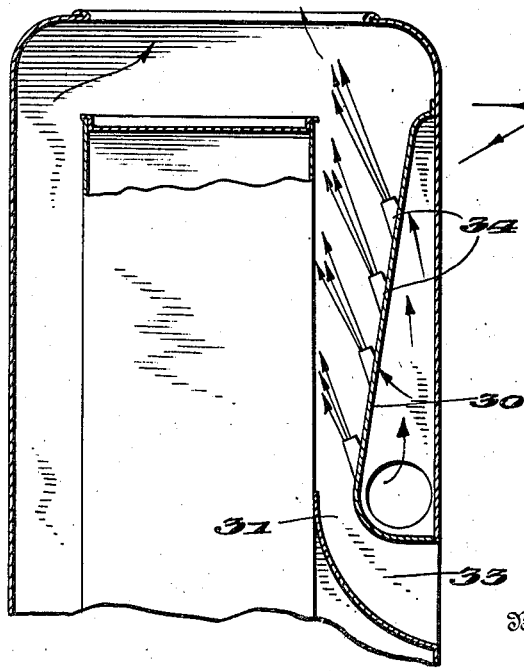
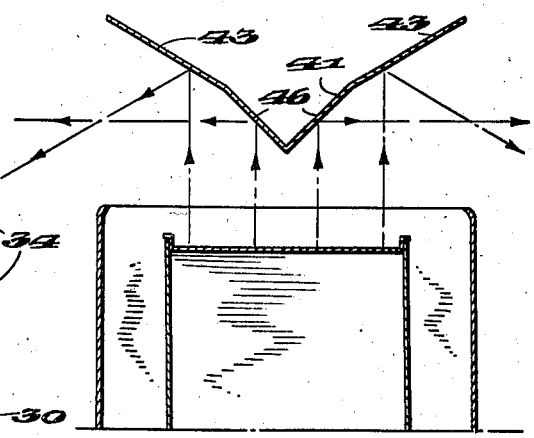
Inventor
Charles P. Grimes,
By W. S. M. Howell
Attorney May 2, 1944. C. P. GRIMES 2,348,127
HEAT TRANSFER AND DISSEMINATING APPARATUS
Filed Aug. 24, 1939 5 Sheets-Sheet 5

Inventor
Charles P. Grimes,
By W. S. M. Howell
Attorney

Patented May 2, 1944

2,348,127

UNITED STATES PATENT OFFICE 2,348,127

HEAT TRANSFER AND DISSEMINATING APPARATUS

Charles P. Grimes, Syracuse, N. Y., assignor of one-half to W. Herbert Bretzlaff, Detroit, Mich.

Application August 24, 1939, Serial No. 291,789

6 Claims. (Cl. 257—137)

This invention relates to heating devices and is particularly directed to a heat disseminating attachment for room heaters of the gas, oil, coal or wood burning type as well as steam radiators.

It has been observed that much greater efficiency can be obtained from any type of heating device if the heat generated or radiated therefrom is caused to flow away from the heating unit along the floor of the enclosure to be heated prior to rising to the upper portions of the enclosure by natural circulation. By reason of this method of circulating the heat, cold drafts adjacent the floor are eliminated as is also the tendency of the heat to become stagnant in the upper portion of the room.

The primary object of this invention resides in the provision of a simple inexpensive disseminating device which may be built into or removably secured to a room heater and which will, when in active operation, cause the heat from the heater to flow in a downward path toward and along the floor away from the heater.

It is also an object of the invention to provide an attachment of the type mentioned which will perform the desired operations without affecting the primary air supply of the heater with which it is associated in the event such heater is of the unit fired type.

Another object rests in so forming the device that it may be applied to a standard room heater without altering the heater or requiring the use of any tools, the device also being so constructed as to interfere as little as possible with the natural flow of heat from the stove when the device is not in active operation.

A still further object rests in providing a disseminator with a chamber for the reception of air under pressure and an outlet for the air, said outlet preferably being in the form of an elongated narrow slot-like jet which extends substantially the full length of the heater and directs a sheet-like stream of air downwardly in front of the heater to coalesce with the heated air rising from the heater and convey it away into the room. It is also within the scope of the invention to provide a plurality of outlet jets and to vary their shape from that specified to any desired extent so long as the sheet or streams of air issuing therefrom follow a downward path from the stove and along the floor in substantially parallel relation thereto.

Another object resides in providing a room heater with heat directing means which, when in active operation, will cause substantially all the heat generated by the heater to move laterally therefrom into the room at a lower level than is possible with conventional heaters whereby the heat will be most effective, the said directing means being so constructed that little or no interference will be offered to the natural circulation of heat when the means is inactive.

Still another object rests in so forming and locating the heat directing means that heat rays radiating from the hottest part of the stove will be reflected laterally into the room in a path extending in the same general direction in which the heated air is caused to move.

Another aim of the present invention is secured by directing the air streams issuing from certain of the jets in the disseminating device onto the highly heated surfaces of the stove at an angle to produce a scrubbing effect whereby more heat will be extracted therefrom and greater efficiency of the heater secured, the streams of air also inducing a circulation of air at atmospheric pressures over the heated stove surfaces so that the usual hot insulating coating of air adjacent such surfaces will be broken up and otherwise prevented from interfering with the liberation of heat.

Another object intended is the formation of a disseminating device which can be readily applied to a conventional drum-type of heater frequently used in factories and shops, this latter form of device also being provided with jet means to direct streams of air under pressure along a heated stove surface in a direction countercurrent to the natural circulation, the heated air issuing from this form of device when in active operation also being directed downwardly toward the floor where it is most essential to the comfort of the occupants of the room or other inclosure.

Other objects will be apparent from the following description and the accompanying drawings in which a disseminator constructed in accordance with the present invention has been illustrated.

In the drawings:

Fig. 1 is a perspective view of a room heater provided with an air heating and disseminating attachment constituting the present invention;

Fig. 2 is a vertical sectional view taken through the upper portion of a room heater and its associated air disseminating attachment;

Fig. 3 is a vertical sectional view taken on the plane indicated by the line III—III of Fig. 2 and illustrating a thermostatically operated relief valve;

Fig. 3A is a vertical sectional view of a modified form of relief valve operated by air under pressure;

Fig. 4 is a vertical sectional view illustrating a slightly modified form of the present invention;

Fig. 5 is a similar view of a still further modification.

Fig. 6 is a plan view of a slightly modified disseminator;

Fig. 7 is a vertical sectional view taken through a still further modified disseminator;

Fig. 8 is a similar view of a room heater having a disseminating device incorporated therein, the device being disposed at the side of the heater in place of at the top as in the prior forms;

Fig. 9 is a view similar to Fig. 8, the disseminator being formed with a plurality of jets;

Fig. 10 is also a vertical sectional view of a heater with air circulating means formed therewith, jets being provided to direct streams of air concurrently with the natural flow of air through the heater;

Fig. 13 is a detail sectional view of a reflector attachment employed with a stove to direct the radiated heat laterally from the top of the stove into the room.

Figure 11:
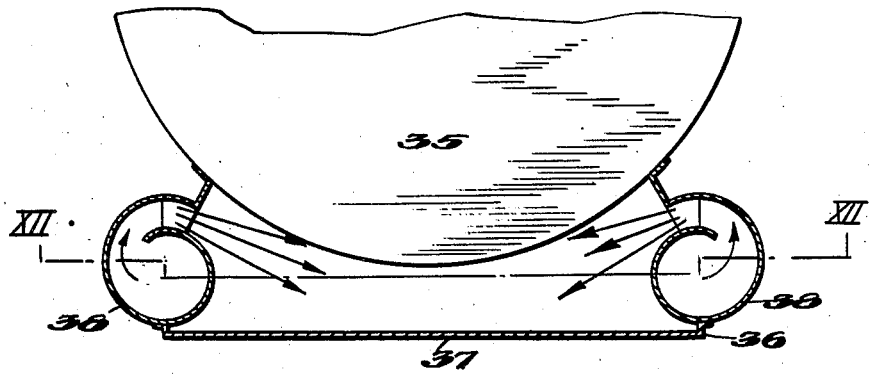
Fig. 11 is a horizontal sectional view of a heat ejector mechanism formed in accordance with the invention for use on tower or drum-type stoves such as are used in shops and factories.

In the form of the invention illustrated in Figs. 1 to 3, an ordinary gas-fired room heater of conventional design has been indicated by the numeral 1. It should be understood, however, at this juncture that the heat exchanging and disseminating apparatus forming the present invention, while highly useful in connection with such a heater, is not necessarily limited thereto, but may be employed with equal facility in association with other types of heaters, such as coal burning stoves or the many various types of gas and oil burning heaters, or in connection with room radiators through which steam or hot water is circulated. It will also be understood, as the description progresses, that the apparatus forming the present invention may be formed to comprise an attachment for heaters of the type above indicated, that is, an accessory thereto, or may be integrally embodied therein during manufacture.

Room heaters indicated at 1 are of the so-called circulating type and are widely used in the heating of small homes, store rooms, garages and the like. Such heaters comprise outer casings of the type indicated at 2, gas, coal or oil burners 3, the latter in this instance being shown as of the gas-fired radiant type, and a drum or radiator 4. The latter is mounted within the casing 2 in spaced relation from the walls thereof in order to provide an air circulating space 5, permitting air, drawn from the floor of the room, to pass generally upwardly through the space 5, sweeping over the heated surfaces of the drum or radiator 4 and thereby absorbing heat. Normally, this heated air is liberated into the room through a grill or openings of the type indicated at 6 formed in the top of the casing. The drum or radiator 4 is connected with an outlet flue 7 which leads to a chimney or other stack outlet so that the products of combustion may be led to the atmosphere.

These heaters find favor in many capacities where large central heating systems of the so-called furnace types cannot be advantageously used. They are somewhat objectionable, however, in that heat released or radiated therefrom tends to pass upwardly in a room toward the ceiling, leaving the floor cold. It has been found that the effectiveness of such a heater may be greatly improved and a better distribution of heat obtained therefrom by the provision of the heat exchanging and disseminating apparatus, indicated generally by the reference character A, which is adapted to be carried in connection with the top of the heater.

In the preferred form, the apparatus A consists of a head composed of sheet metal walls formed to comprise a back wall 8, a horizontal top wall 9, vertical end walls 10—10 and an open bottom and an open front. From a dimensional standpoint, the head is of approximately the same size as the top of the room heater, as shown more particularly in Figs. 1 and 2. The lower edges of the back and end walls are reenforced by a metallic bar 11, which bar is provided with positioning lugs 12 arranged to pass through the grill openings 6 in the top of the heater casing so as to definitely locate the head of the attachment in relation to the top of the casing 2.

As shown in Fig. 2, the interior of the disseminator head or casing is formed with an angularly situated baffle wall 13. This wall is arranged at an angle of from 30 to 45 degrees with respect to the vertical and is coextensive with the length of the disseminator head. The lower edge of the wall 13 may be confined between the lower portions of the wall 8 and the bar 11 and suitably secured thereto as by welding or riveting. Also, the end edges of the baffle wall 13 may be likewise fastened to the end walls 10—10 of the disseminator head. The upper portions of the baffle wall 13 include a substantially arcuate region 14 which terminates in a downwardly and angularly directed extension 15 which projects toward the open front of the disseminator head, the extension 15 being slightly spaced from a corresponding downwardly and angularly extending portion 16 of the top wall 9 of the disseminator head in order to produce a restricted jet-like passage or slot 17 in the upper portion of the disseminator head for the advancement of a forced air stream under accelerated velocity rates. The wall 13 thus divides the interior of the disseminator head into upper and lower compartments B and C respectively.

To positively direct heat issuing from the top of the heater and its associated disseminator in a substantially downward direction, the back wall 8 of the disseminator is connected with a conduit 18 communicating with the discharge of one or more motor driven blowers 19. Usually, as a matter of convenience, the blowers are driven by electric motors which operate on standard house circuits. With this construction, it will be seen that air will be positively advanced by the blower or blowers through the conduit 18 and thence into the upper compartment B, passing through the compartment B over the baffle wall 13 from which it absorbs heat and then, at high velocity, through the restricted slot or throat 17, issuing from the forward open end of the slot or throat in a downward direction, as indicated more particularly by the arrows in Fig. 2.

This forced discharge of air from the throat 17 acts after the manner of an aspirator in inducing positive flow of air upwardly through the space 5 of the heater casing 2 and through the lower compartment C with the result that the heated air delivered to and discharged from the compartment C is mixed with the blast of air discharged from the throat 17, and a merged stream of heated air produced which is positively directed toward the floor of the room in which the heater is located. By this arrangement, the efficiency of the heater is very considerably improved and increased comfort provided for those employing the same, particularly in the increased range of effectiveness of the heater and in the elimination of cold or cool floor regions. In addition, due to the improved heat transfer over ordinary gravity circulation, the temperatures of the gases delivered to the flue 7 are much lower.

Any suitable means may be provided for energizing the electric motor 20 employed for operating the blower 19, such as a manually operated switch or an automatic thermostatically controlled switch.

To protect the motor 20 from excessive heat generated by the stove during the time the motor and its associated blower are not in operation, the top wall 9 of the disseminator is formed with a heat outlet opening 21, this opening being normally protected by a dome-shaped grid 22. The opening 21 is automatically opened or closed by a disk 23 affixed to the outer end of a bimetallic thermostat 24.

When the blower is in operation, relatively cool air withdrawn from the room sweeps over the thermostat 24 in passing through the compartment B. This flow of relatively cool air produces a reduced temperature around the thermostat 24 whereby the disk 23 is maintained in its seated position, as shown in Fig. 3, closing the opening 21. However, when the operation of the blower and motor is discontinued, the heat liberated from the top of the heater passes through the walls encompassing the compartment B and would find its way readily through the conduit 18 into the casing of the motor 20 if the latter were not protected. Advantage is taken of this rise in temperature to protect the motor from overheating by causing the increase in temperature to flex the bimetallic strips of the thermostat 24, so that the disk 23 will be moved to a position uncovering the outlet opening 21. This provides for releasing heat from the compartment B and permitting of a gravity circulation of air through the blower, the conduit 18, compartment B, and thence through outlet 21 to the atmosphere, positively cooling the walls of these parts to reduce temperatures and protect the motor. Upon sufficient cooling, the thermostat returns the disk 23 to its normal position of closure.

A slightly different form of valve for closing the outlet opening 21 is illustrated in Fig. 3A. In this form, the grid 22a supports a guide stem 24a on which is slidably supported the valve disk 23a. When the blower is not in operation, gravity will cause the disk to drop to the lower end of the guide, thus permitting air under atmospheric pressure to pass through the opening 21. As soon, however, as the blower is started, the quick rush of air through the outlet opening 21 will cause the disk 23a to move upwardly on the guide and close the opening. The disk will remain in this latter position until the blower ceases operating.

A variation of the invention is disclosed in Fig. 4 wherein the baffle wall 13a has its upper side provided with a diverter 25. This diverter is arranged immediately in front of the conduit 18a and is employed to effect a substantially even distribution of the forced air throughout all portions of the restricted throat or passage 17, so that there will be a uniform discharge of heated air from the open front of the disseminator attachment throughout its full length. Also in this form of the invention, the conduit 18a is in the form of a downwardly bent arcuate fitting or elbow, so that the blower 19 and the motor 20 may occupy a somewhat more lowered position than that disclosed in Fig. 2. The blower and motor may be protected by a panel 26 arranged between the motor and the walls of the heater casing. Preferably, the panel 26 is formed from a material which resists heat transmission.

In Fig. 5, a further variation is disclosed wherein the baffle wall 13b is formed with a downwardly directed nozzle 27, by which a portion of the forced air entering the compartment B may be diverted and directed downwardly, as shown by the arrows, upon the highly heated top of the drum-shaped radiator 4, effecting the removal of heat at a high rate of transfer from the top of said radiator so that the temperature of the air discharged from the open front of the disseminator may be somewhat higher than that obtained in the previously described forms of the invention. It will be appreciated that one or more of the nozzles or jets 27 may be used.

In Fig. 6, a disseminator of the type described above has been illustrated as it appears from the top. The conduit 18b leading from the device to the blower is disposed at an angle to the rear wall of the former to arrange the blower a greater distance from the flue 7 of the heater. This measure is taken to prevent, as much as possible, the impingement of heat radiating from the flue pipe on the blower and premature deterioration of the driving motor.

Another advantage resulting from this arrangement of the blower is a more uniform distribution of air within the chamber B which makes the stream of air issuing from the jet 17 have a uniform velocity throughout its entire width. The angularity of the conduit 18b with respect to the device may be varied, the proper degree depending upon the length of the disseminator.

The modified type of device illustrated in Fig. 7 corresponds substantially with the other types above described with the exception of the baffle wall 13c which, in this instance, is provided with a plurality of differently inclined sections 28 and 29. The upper section 28 is inclined to such a degree that vertical heat rays, indicated by the line H' in Fig. 7, radiating from the member 4, will be reflected outwardly through the open front of the head in the same general direction as the stream of air flowing from the outlet 17. The section 29 also reflects heat rays but due to the greater degree of angularity thereof, the reflections pass outwardly from the device in a substantially horizontal plane. The particular degree of inclination of the sections has been selected in order to prevent any heat rays from being reflected back into the stove. The arrangement shown provides for a maximum dissemination of heat from the stove on which it is positioned. As shown in Fig. 7, the angles of incidence X and Y of the heat rays H and H' moving toward the various portions of the reflector are equal to the corresponding angles of reflection X' and Y' and the direction of the reflected rays may be changed as desired by varying the angularity of the sections 28 and 29 of the reflecting baffle 13c.

In Figs. 8 to 12 inclusive, the disseminating device has been illustrated in position on a vertical side of a heater. In the forms shown in Figs. 8, 9 and 10, the circulation inducing means has been incorporated or built in as a standard part of the stove by providing an angularly disposed wall 30 within the heater casing in spaced relation from a side wall thereof. The wall 30 is connected at its edges with the casing and cooperates therewith to form a chamber B' for the reception of air from an associated blower of any suitable type such as that shown in the preferred forms of the invention above described.

As in the previously described forms of the invention, one or more restricted jets are provided to permit the flow of air under pressure from the chamber B'. In Fig. 8, a single outlet 31 has been provided adjacent the upper portion of the wall 30 while in Fig. 9 a plurality of vertically spaced outlets 32 have been formed therein. All of the outlet jets, however, are so disposed as to direct blasts of air angularly against the heated side walls of the combustion vessel of the stove to extract heat therefrom with great rapidity. Due to the continuous flow of air, a scrubbing action results which forces the ambient heated air away from the hot surfaces and causes it to flow to the region being heated.

Also in Figs. 8 and 9, the upper portion of the wall 30 is disposed in close relation to the radiator to provide a narrow throat communicating at its upper end with the atmosphere through the open top of the stove. When the blower is operated and the stream or streams of air issue through the outlet jets, air from the exterior of the stove will be induced to flow through the open top and restricted throat to where it will be mixed with the air stream and all heated by contact with exterior walls of the combustion vessel or radiator 4. After being thus heated, the air passes, still under slight pressure, outwardly from the stove casing through the outlet 33 provided near the lower end of the casing. It will be noted that in Figs. 8 and 9, the flow of air, when the blower is operating, is countercurrent to the natural circulation of air through the heater. It should also be noted, however, that since an open passage extends from the outlet 33 to the upper end of the casing, the natural circulation can take place unimpeded when the blower is not in operation.

The direction of the outlet jets 34 in the form shown in Fig. 10 has been reversed to cause the streams of air to flow concurrently with the air flowing under natural circulation. This form has the restricted throat formed between the lower end of the wall 30 and the radiator and an increased flow of air through the channels of natural circulation will result when the blower of this form is operated. While this type of disseminator will cause a heater to operate more efficiently, it is not as desirable as the forms in which the air is discharged from the lower portions of the stove or toward the floor.

Figure 12:
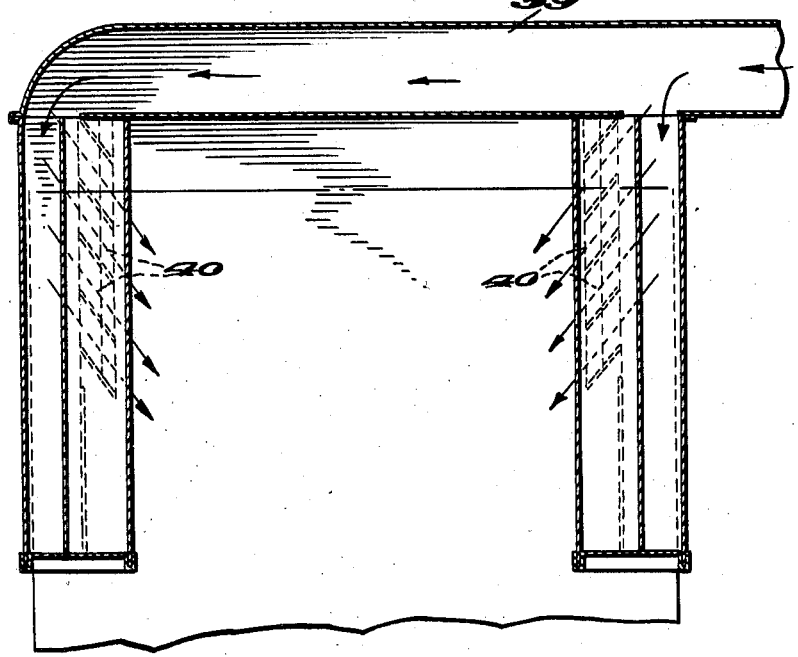
Fig. 12 is a vertical sectional view taken through the ejector shown in Fig. 11, the plane of the section being indicated by the line XII—XII.

Figs. 11 and 12 illustrate a disseminator formed in accordance with the invention for use with a drum or tower type of heater frequently employed in factories, shops and garages. The radiator or combustion vessel 35 of this type of heater is cylindrical and the disseminator 36 is adapted to be removably attached thereto. In this form of device, there is provided a wall 37 which is held in spaced relation from the side of the vessel 35 by a pair of substantially vertical cylinders 38 which are closed at their lower ends and communicate with a manifold 39 at their upper ends. Air from a blower is delivered to the manifold and enters the cylinder 38 from the upper ends.

As shown in Fig. 12, the air is released from the cylinders through angularly directed jets 40 which are so disposed that the streams of air will impinge upon the heated wall of vessel 35 while moving downwardly. As in the prior forms, this downward rush of air also induces a flow of air from above the heater, downwardly through the space between the wall 37 and the heater and out at the lower portion for movement along the floor.

Due to the simplicity and the lack of moving or separable parts in all forms of the devices illustrated, they are completely foolproof and cannot get out of order. The manner in which they are constructed is such that they offer no interference to the operation of the heater to which they are applied when the devices are not operating and greatly increase the efficiency of the heaters when in active operation. Many advantages are secured through the use of the disseminators, some being the placing of heat in the lower parts of the room where it is most needed and desired, protecting the wall and ceiling surfaces from intense heat and dirt usually resulting when natural circulation is permitted, the utilization of all the heat generated by the stove, the rapid heat exchange resulting from scrubbing the most highly heated upper surfaces of the radiator or combustion vessel with streams of air under pressure, the reflection of radiated heat from the hottest portions of the stove in a path extending laterally from the stove and in the same general direction as that traversed by the heated air forced to flow from the heater.

In Fig. 13, a still further modified form of device has been illustrated, the stove in this instance having a reflector shield 41 positioned over the upper end to prevent heat from the stove from rising directly to the ceiling. The shield 41 is formed of a pair of sections similar to the baffle wall 13c in the form of the invention shown in Fig. 7. Each section of the shield 41 is composed of a pair of differently inclined portions 46 and 43, the former being inclined to a slightly greater degree than the latter to reflect heat rays radiating from the center of the combustion vessel laterally from the stove in substantially horizontal planes. The portions 43 are so inclined that the rays striking them will be reflected outwardly and downwardly from the stove to heat the regions surrounding the lower portions of the stove. No blower is employed with the above described shield, its primary purpose being to reflect the rays radiating from the highly heated top wall of the combustion vessel.

In view of the foregoing, it will be seen that the present invention provides a comparatively simple and inexpensive attachment for room heaters from which greatly improved efficiency and comfort are obtainable. The attachment has the advantage of being readily applied as an accessory to many standard types of room heaters or, if desired, may be readily built into such heaters during manufacture. The restricted outlet for the air pressure chamber B provides a construction by which the heated air issuing from the top of the stove or heater is positively directed under forced flow in a downward direction, causing the heat of the stove or heater to be applied to floor region before turning upwardly toward the ceiling. The electric motor is thoroughly protected from excessive heat and, due to its simplicity, the apparatus will function for prolonged periods of time without requiring repair, service or adjustment.

The mechanism also serves to carry out the objects of diluting a stream of hot air with warmed air from the room or other source to reduce the temperature of the hot air. This dilution of the hot air causes it to lose its major tendency to rise to the ceiling and the air in all parts of the room will be at a substantially uniform temperature. By directing the stream of hot air downwardly toward the floor, it, in effect, burrows into the cool air usually adjacent the floor and mixes therewith to be lowered in temperature while the cooler air is raised to a comfortable temperature and the resulting air mixture is not at a sufficiently high temperature to have any great tendency to flow upward to the ceiling.

If found desirable, the inlet to the blower could be supplied with a conduit leading to a point in the room remotely located from the heater or to a point located exteriorly of the building to supply the blower with fresh air at lowered temperature.

What is claimed is:

1. In combination with a heat exchanger, a body having a chamber formed therewith for the reception of air under pressure, said body being disposed adjacent a heated surface of said heat exchanger with a limited space therebetween in open communication with the atmosphere, and jet means formed with said body for discharging a stream of air into the space between the heated surface of the exchanger and said body, said jet means being so disposed as to direct the stream of air issuing therefrom in an angular direction against the heated surface of said exchanger, said stream also serving to induce a flow of air at atmospheric pressure through said space.

2. In combination with a heater of the type having a radiator for receiving hot fluids, a disseminator attachment removably secured to said radiator, said attachment comprising a sheet-like body, a casing formed with each side edge of said body and serving to maintain it in spaced relation from a wall of said radiator, said casings being formed with chambers for the reception of air under pressure, outlet jets formed in the walls of said casings adjacent the radiator, said jets being inclined to direct streams of air downwardly into the space between the body and the radiator and into direct engagement with the latter.

3. A heat disseminator for heat exchangers of the drum-type comprising a sheet-like body, a manifold mounted at the upper end of said body, a tubular chamber having a closed lower end carried at each side of said body and communicating with said manifold, said chambers serving to space said body from the side wall of said heat exchanger to provide an air passage, and jet means provided on the inner walls of said tubular chambers, said jet means being arranged to direct streams of air downwardly into wiping engagement with the wall of said heat exchanger in said passage.

4. In combination with a heat exchanger, a casing disposed adjacent to said heat exchanger and having a chamber for receiving air under pressure, jet means formed with said casing to provide an outlet for the air, the path of air issuing from said jet being generally downward and angularly against a heated vertical wall of said heat exchanger, the location of said jet and the positive flow of air therefrom serving to effect the removal of static air from the regions closely adjacent to the exchanger wall and to induce a flow of air at atmospheric pressure therealong, the heated air removed from around the exchanger wall and the air from said jet means flowing downward toward the floor after discharge from said casing.

5. In combination with a heat exchanger, a casing disposed adjacent to said heat exchanger and having a chamber for receiving air under pressure, the walls of said chamber being spaced from said heat exchanger to provide a restricted passageway therebetween for the travel of air to be heated by said heat exchanger, jet means communicating with said chamber and forming an outlet for the forced discharge of air from said chamber into said passageway and into contact with the walls of said heat exchanger, the path of air issuing from said jet means being generally downward and angular against a heated wall of said heat exchanger, the location of said jet means and the positive flow of air therefrom serving to effect the removal of static air from the regions closely adjacent to the heated exchanger wall and induce a flow of air therealong, the heated air removed from around the exchanger wall and the air from said jet means flowing generally downwardly through said restricted passage toward the bottom of the casing and a heated air outlet formed therein.

6. A room heater comprising a floor supported outer casing adapted to receive a heat radiating drum, the walls of the casing and drum being relatively spaced to provide a passageway for the circulation of air over the heated surfaces of the drum, said casing being formed with a chamber lying wholly outside of said drum, the inner wall of said chamber being spaced from said drum in radiant heat-absorbing relation thereto, means for advancing air under positive flow through said chamber, and a downwardly directed jet-like outlet for warmed air released from said chamber, said outlet being disposed in open communication with said passageway and being arranged to direct the air stream issuing therefrom into direct wiping contact with the walls of said drum, whereby to establish a forced flow of air in a generally downward direction through said passageway.

CHARLES P. GRIMES.